(12) United States Patent
Thomas (10) Patent No.: US 6,597,357 B1
(45) Date of Patent: Jul. 22, 2003

(54) METHOD AND SYSTEM FOR EFFICIENTLY IMPLEMENTING TWO SIDED VERTEX LIGHTING IN HARDWARE

(75) Inventor: Jeff Thomas, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/467,561

(22) Filed: Dec. 20, 1999

(65) Prior Publication Data (65)

(51) Int. Cl.$^7$ .............................................. G06T 15/60
(52) U.S. Cl. ........................................ 345/426; 345/589
(58) Field of Search ................................. 345/426, 427, 345/503, 506, 519, 530, 589

(56) References Cited

U.S. PATENT DOCUMENTS 4,866,637 A * 9/1989 Gonzalez-Lopez et al. . 345/426
5,886,711 A * 3/1999 Rossin et al. ................ 345/503

* cited by examiner

Primary Examiner—Mark Zimmerman
Assistant Examiner—Lance W. Sealey
(74) Attorney, Agent, or Firm—Woodcock Washburn LLP (57) ABSTRACT

In a graphics subsystem of a computer system, a method for performing front-side and back-side vertex lighting of successive vertices in the graphics pipeline without incurring pipeline stalls. The method includes computing the dot product terms for a plurality of light sources with respect to a vertex to obtain a magnitude and a sign of the dot product terms, wherein a positive dot product term corresponds to a front-side color and a negative dot product term corresponds to a back-side color. For each of the plurality of light sources having a positive dot product term, a color value corresponding to the light source for the vertex is computed. The resulting color values are multiplied and accumulated in parallel to obtain a respective front-side vertex color and back-side vertex color. The geometric orientation of the polygon corresponding to the vertex is then determined to ascertain whether the polygon is front facing or back facing. If the corresponding polygon is front facing, the front-side vertex color is output. If the corresponding polygon is back facing, the back-side vertex color is output, thereby allowing front-side and back-side vertex lighting to precede efficiently without pipeline stalling.

13 Claims, 5 Drawing Sheets

METHOD AND SYSTEM FOR EFFICIENTLY IMPLEMENTING TWO SIDED VERTEX LIGHTING IN HARDWARE

FIELD OF THE INVENTION

The field of the present invention pertains to lighting polygon services in three dimensional computer graphics. More particularly, the present invention relates to a method and system for efficiently computing two sided vertex lighting in a three dimensional computer graphics rendering system.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices.

Graphics have also become a key technology for communicating ideas, data, and trends in most areas of commerce, science, and education. Modern graphics workstations often implement real time user interaction with three dimensional (3D) models and pseudo-realistic images. These workstations typically contain dedicated, special purpose graphics hardware. The progress of semiconductor fabrication technology has made it possible to do real time 3D animation, with color shaded images of complex objects, described by thousands of polygons, on powerful dedicated rendering subsystems. The most recent and most powerful workstations are capable of rendering completely life-like, realistically lighted, 3D objects and structures.

In a typical 3D computer generated object, the surfaces of the 3D object are described by data models. These data models store "primitives" (usually mathematically described polygons and polyhedra) that define the shape of the object, the object attributes, and the connectivity and positioning data describing how the objects fit together. The component polygons and polyhedra connect at common edges defined in terms of common vertices and enclosed volumes. The polygons are textured, Z-buffered, and shaded onto an array of pixels, creating a realistic 3D image.

In a typical graphics computer, most of the actual rendering computation is performed by a graphics subsystem included in the graphics computer. The 3D object data models are "traversed" by a software program (e.g., in response to user input) running on one or more processors in a processor subsystem within the graphics computer. The primitives describing the 3D object are processed by the processor subsystem and sent to the graphics subsystem for rendering. For example, a 3D polyhedra model of an object is sent to the graphics subsystem as contiguous strips of polygons, sent to the graphics subsystem as a graphics data stream (e.g., primitives, rendering commands, instructions, etc.). This graphics data stream provides the graphics subsystem with all the information required to render the 3D object and the resulting scene. Such information includes, for example, specular highlighting, anti-aliasing, depth, transparency, and the like. Using this information, the graphics subsystem performs all the computational processing required to realistically render the 3D object. The hardware of the graphics subsystem is specially tuned to perform such processing quickly and efficiently in comparison to the processor subsystem.

Lighting and the realistic rendering of lighting effects is becoming an increasingly important part of the 3D rendering process. In order to portray a more realistic real-world representation, lighting effects (e.g., specular highlights, reflections, shadows, etc.) are usually applied to the 3D objects of the scene during rendering. The term "lighting" often refers to the application of specular highlights after texturing for generating more realistic lighting effects within the resulting image. Other lighting techniques are also used, such as, for example, using multi-texturing with two-dimensional (2D) texture images, or texture maps, after the initial texturing. For example, given a featureless solid cube and a texture map defining a wood grain pattern, texture mapping techniques may be used to map the wood grain pattern onto the cube and lighting techniques can be used to realistically color the surface of the cube in accordance with the 3D environment of the image. The resulting is that of a cube that appears to be made of wood having realistic specular highlights in accordance with light sources (e.g., ambient lights, spotlights, diffuse light, etc.) within the scene.

There exists a problem however, with regard to lighting successive polygons in an environment where the geometry of the successive polygons change with respect to the viewing point. A significant portion of rendering computation for the 3D image involves computing realistic lighting effects from the one or more light sources within the 3D scene. Accordingly, it is very desirable for the lighting operations within the 3D pipeline to proceed as efficiently as possible. Conventional 3D graphics pipelines are currently set up to compute lighting of successive polygons based upon the polygons being viewed from a common direction, or viewpoint. The geometry of the polygons with respect to the view point may position one or more polygons such that the "back-side" is being viewed as opposed to the "front-side" as with the preceding polygons. This necessitates the graphics pipeline computing the back-side color for these polygons as opposed to the front-side color for the preceding polygons. Due to the nature of the graphics pipeline, this causes a stall, wherein queued data (e.g., color information from preceding vertices of preceding polygons) needs to be discarded and new data for the back-side color of the preceding.vertices needs to be computed. The consequences of the pipeline stall is a significant decrease in the rendering speed.

Thus, what is needed is a method for rendering back-side color as needed without incurring a pipeline stall and the associated loss of efficiency. The required solution should be able to seamlessly handle both the front-side lighting and the back-side lighting as dictated by the geometry of the scene being rendered. In addition, the required solution should be capable of handling both front-side and back-side lighting without incurring an excessive hardware penalty in its implementation. The present invention provides a novel solution to the above requirements.

SUMMARY OF THE INVENTION

The present invention is a method and system for efficiently implementing two sided vertex lighting in the hardware of the graphics rendering pipeline. The present invention provides a method for rendering back-side color as needed without incurring a pipeline stall and the associated loss of efficiency. The system the present invention is able to seamlessly handle both the front-side lighting and the back-side lighting as dictated by the geometry of the scene being rendered. In addition, the system the present invention can be implemented without incurring an excessive hardware penalty (e.g., die surface area).

In one embodiment, the present invention is implemented as a system of logic included in a graphics pipeline for performing front-side and back-side vertex lighting of successive vertices in the graphics pipeline of a computer system without incurring pipeline stalls. As successive vertices are received, for each vertex, the system of the present invention computes the dot product terms for a plurality of light sources with respect to the vertex to obtain a magnitude and a sign of the dot product terms, wherein a positive dot product term corresponds to a front-side color and a negative dot product term corresponds to a back-side color. For each of the plurality of light sources, a color value corresponding to the light source for the vertex is computed. The resulting color values are multiplied and accumulated in parallel to obtain a respective front-side vertex color and back-side vertex color. The negative signed color values are multiplied and accumulated to obtain a back-side color. The positive signed vertex colors are multiplied and accumulated to obtain a front-side color. The geometric orientation of the polygon corresponding to the vertex is then determined (e.g., by the geometry subsystem) to ascertain whether the polygon is front facing or back facing. If the corresponding polygon is front facing, the front-side vertex color is output. If the corresponding polygon is back facing, the back-side vertex color is output, thereby allowing front-side and back-side vertex lighting to precede efficiently without pipeline stalling. The correct color is output (e.g., multiplexed out) once the geometry of the polygon corresponding to the vertex is known.

In so doing, only the multiply and accumulate hardware is duplicated, since resulting color values for both the front-side and the back-side are multiplied and accumulated in parallel. Hence, the system of the present invention can be efficiently implemented without incurring excessive die area penalties.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

In the following detailed description of the present invention, a method and system for efficiently implementing two sided vertex lighting in graphics subsystem hardware, numerous specific details are set forth in order to provide a thorough understanding of the present invention. However, it will be obvious to one skilled in the art that the present invention may be practiced without these specific details and on systems which do not fully implement the depicted architectural details. In other instances well known methods, procedures, components, and circuits have not been described in detail as not to unnecessarily obscure aspects of the present invention. It should also be recognized by one skilled in the art that some aspects of the present invention pertain to graphics subsystems, and as such, can apply not only to graphics computers, but to any computer based image generator, such as, for example, a computer implemented image generator having simple controlling hardware and which connects directly to data base memory or a mass storage device.

Some portions of the detailed descriptions which follow are presented in terms of procedures, logic blocks, processing, and other symbolic representations of operations on data bits within a computer system. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical, optical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering" or "sending" or "processing" or "executing" or "storing" or the like, refer to the action and processes of a computer system (e.g., computer system 100 of FIG. 1), or similar data processing device, that manipulates and transforms data represented as physical (electronic) quantities within the computer system's registers and memories into other data similarly represented as physical quantities within the computer system memories or registers or other such information storage, transmission or display devices.

The present invention is a method and system for efficiently implementing two sided vertex lighting in the hardware of the graphics rendering pipeline of a computer system. The present invention provides a method for rendering back-side color as needed without incurring a pipeline stall and the associated loss of efficiency. The system the present invention is able to seamlessly handle both the front-side lighting and the back-side lighting as dictated by the geometry of the scene being rendered. In addition, the system the present invention can be implemented without incurring an excessive hardware penalty (e.g., die surface area). The present invention and its benefits are further described below.

Figure 1:
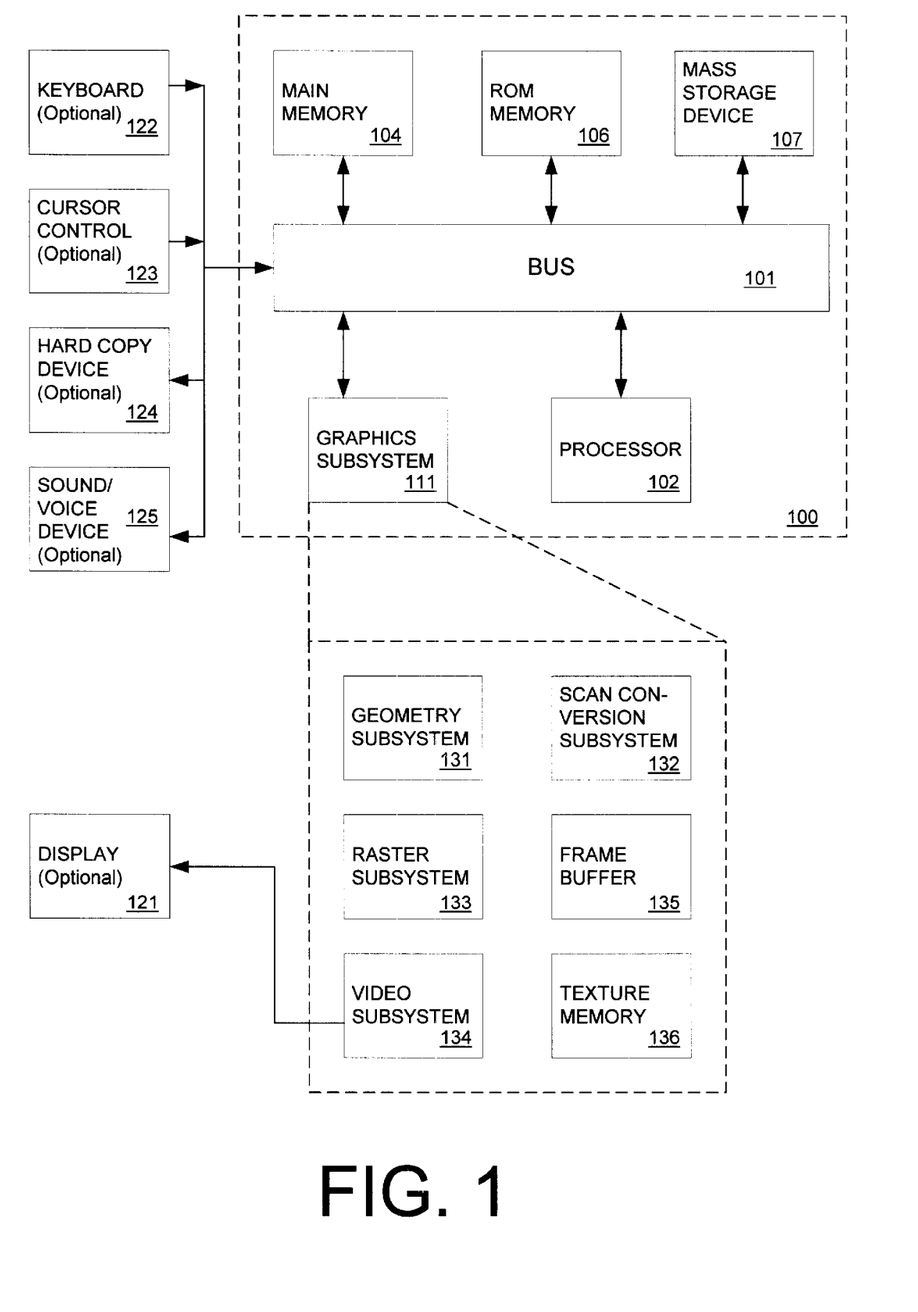
FIG. 1 is a diagram of a 3D graphics computer system in accordance with one embodiment of the present invention.

Referring now to FIG. 1, a diagram of a 3D graphics computer system 100 in accordance with one embodiment of the present invention is shown. Computer system 100 depicts a basic implementation of a computer system in accordance with the present invention. Computer system 100 includes a bus 101 for transmitting digital information between the various parts of the computer system. One or more microprocessors 102 are coupled to bus 101 for processing information. The information along with the instructions of how the information is to be processed are stored in a hierarchical memory system comprised of mass storage device 107, read only memory 106, and main memory 104. Mass storage device 107 is used to store large amounts of digital data. The mass storage device 107 can consist one or more hard disk drives, floppy disk drives, optical disk drives, tape drives, CD ROM drives, or any number of other types of storage devices having media for storing data digitally. A read only memory (ROM) 106 is used to store digital data of a permanent basis, such as instructions for the microprocessors. Main memory 104 is used for storing digital data on an intermediate basis. Main memory 104 can be dynamic random access memory (DRAM).

Computer system 100 includes a typical 3D graphics rendering system 111. Processor 102 provides the graphics system 111 with graphics data, such as drawing commands, coordinate vertex data, and other data related to an object's geometric position, color, texture, shading, and other surface parameters. In this implementation, the object data is processed by graphics system 111 in the following four pipelined stages: geometry subsystem 131, scan conversion subsystem 132, raster subsystem 133, and a video subsystem 134. The geometry subsystem 131 converts the graphical data from processor 102 into a screen coordinate system. Geometry subsystem 131 performs projection and transformation processes to give depth to a displayed object. The resulting primitives (points, lines, polygons, polyhedra, and the like) supplied by the geometry subsystem 131 are then supplied to the scan conversion subsystem 132. Scan conversion subsystem 132 generates pixel data (e.g., fragments, fragment parameters, color information, and the like) based on these primitives. The scan conversion subsystem 132 also performs interpolation functions to interpolate straight lines so that each intermediate value need not be individually and separately calculated by the geometry subsystem. Next, the pixel data is sent to the raster subsystem 133, where Z-buffering, blending, texturing (using texture data stored in texture memory 136), and antialiasing functions are performed. The resulting pixel values are subsequently stored in frame buffer 135. The video subsystem 134 reads the frame buffer 135, gamma corrects the image information stored therein, and sends the image (in the correct format) to an optional display 121.

Several other optional devices may also be coupled to system 100. For example, an alphanumeric keyboard 122 is used for inputting commands and other information to processor 102. Another type of user input device is cursor control device 123 (a mouse, trackball, joystick, and the like) used for positioning a movable cursor and selecting objects on a computer screen. Another device which may be coupled to bus 101 is a hard copy device 124 (e.g., a laser printer) for printing data or other information onto a tangible medium. Additionally, a sound recording or video option 125 can be coupled to the system 100 to provide multimedia capabilities.

Figure 2:
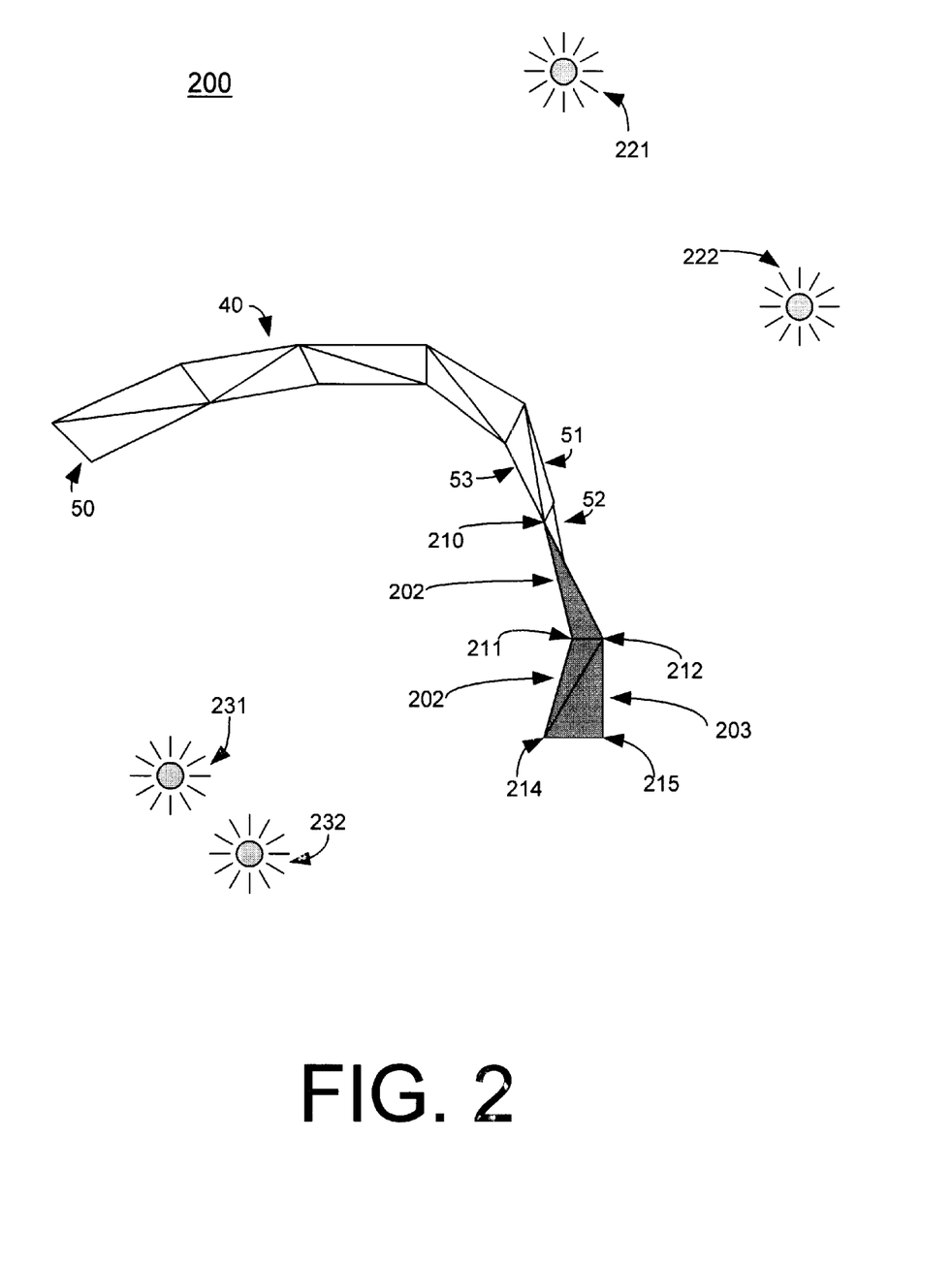
FIG. 2 shows a diagram of a triangle strip having two front-side light sources and two back-side light sources

With reference now to FIG. 2, a triangle strip 40 having two front-side light sources 221 and 222 and two back-side light sources 231 and 232 is shown. Triangle strip 40 is comprised of individual triangle polygons (e.g., polygons 50–53, etc.) as defined by their respective vertices (e.g., vertices 210–215). As described above, the graphics pipeline of typical graphics systems (e.g., graphics system 111) is designed to compute the lighting color of successive triangles based upon viewing them from a common direction. However, the geometry of the triangles with respect to the view point may position one or more triangles such that the "back-side" is being viewed as opposed to the "front-side"
as with the preceding triangles. This is depicted in FIG. 2 as triangles 201–203 having their back-side (e.g., darker shaded) toward the view point, while the immediately preceding triangles 51–53 have their front-side toward the view point. The front-side color includes, for example, specular highlights from front-side lights 221 and 222, while the backside color includes specular highlights from back-side lights 231 and 232.

Each triangle (e.g., polygon) is defined one vertex at a time, as each new vertex defines a new triangle. The lighting color for the polygon is computed for each respective vertex. Accordingly, the preceding two vertices contribute to the color of the newly received vertex as they together define a new triangle. As described above, this cause a problem where the newly defined triangle is back facing while the previously defined triangles were front facing. For example, as depicted in FIG. 2, triangle 52 is front facing. Hence, front facing colors for vertices 210–211 were originally computed. However, the arrival of vertex 212 defines triangle 201 as being back facing as opposed to front facing. Because of this, the front facing color previously computed for vertices 210–211 must be discarded and a new back facing color for the vertices must be computed. The method and system of the present invention functions by insuring this situation does not cause a pipelined stall. In accordance with the present invention, the state of the-previous two vertices (e.g., vertices 211–212) is stored such that it includes information describing both the front-side color and the back-side color. Once the successor vertex is received and system 111 determines that triangle 201 is indeed a back facing triangle, the correct color for the successor vertex (e.g., vertex 212) is output through the pipeline in addition to the correct color for the two preceding vertices (e.g., vertices 211–212). In addition, the present invention provides these correct colors without requiring a complete duplication of the lighting hardware of the graphics pipeline.

Figure 3:
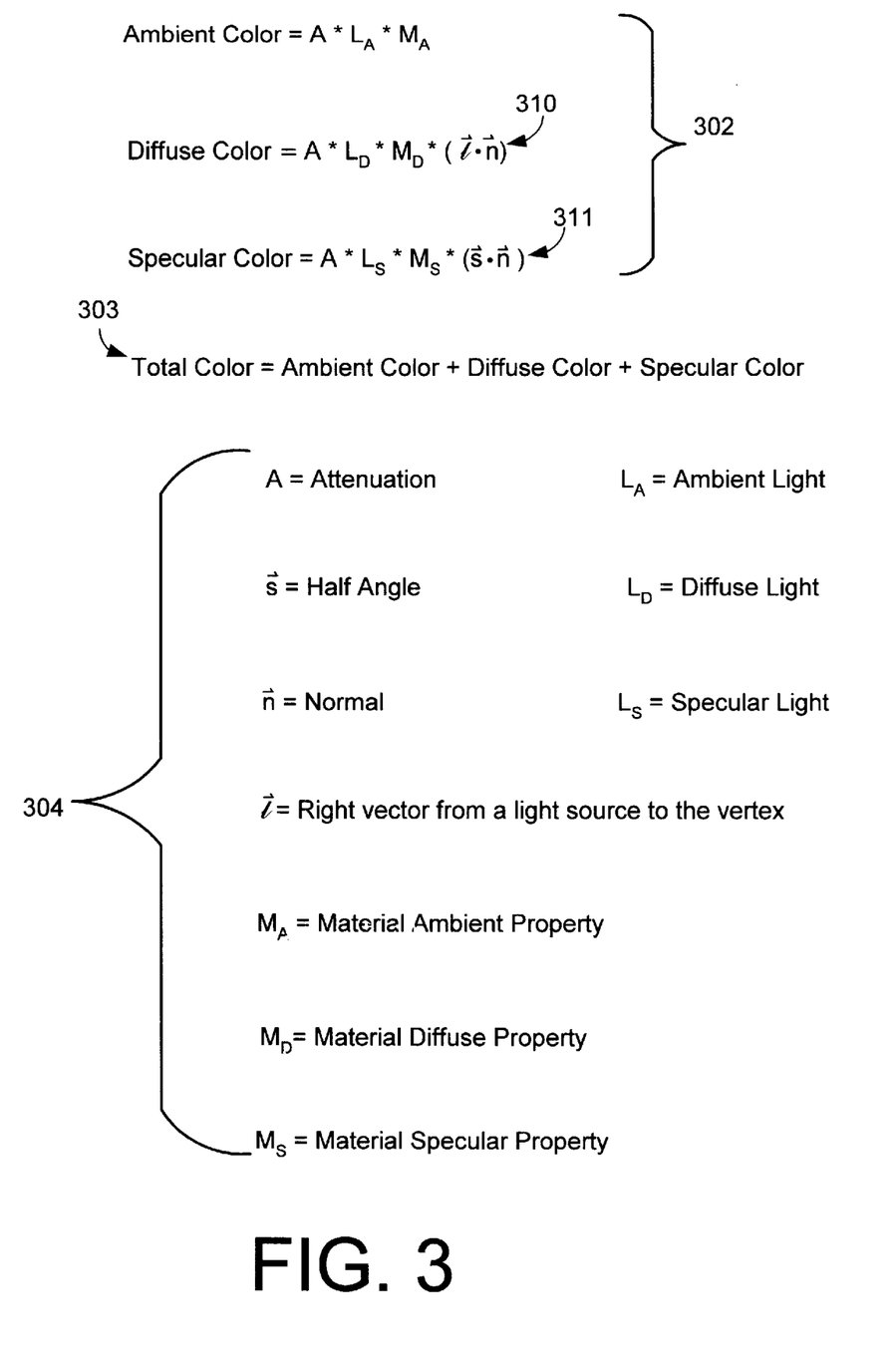
FIG. 3 shows legends depicting the general lighting equations used to compute the colors for the vertices of the triangle strip from FIG. 2, in accordance with one embodiment of the present invention.

Referring now to FIG. 3, legends 302–304 depicting the general lighting equations used to compute the colors for the vertices of triangle strip 40 are shown. Equation 303 shows the expression defining total color for each vertex, wherein total color equals the contribution of the ambient color plus the diffuse color plus the specular color. Legend 304 defines the terms used in the equations of legend 302. Legend 301 shows the general equations for computing ambient light color, diff-use light color, and specular light color.

The present invention functions in part by taking advantage of the fact that the "dot product" terms 310 and 311 for the diffuse color and the specular color have a sign (e.g., positive or negative) corresponding to whether the particular light source is a front-side light source thus yielding a front-side color (e.g., positive) or a back-side light source thus yielding a back-side color (e.g., negative). Since the sign of the dot product terms 310 and 311 indicate whether a front-side or back-side color is computed, the hardware for computing the dot product terms 310–311 need not be duplicated in order to compute both front-side and back-side colors. Only the multiply/accumulate hardware for aggregating the contribution of each light source need be duplicated. The front-side color contributions (e.g., positive sign) are aggregated in one multiply/accumulate unit, while the back-side color contributions (e.g., negative sign) are aggregated in a second multiply/accumulate unit. Once the geometry of the defined triangle is known (e.g., whether it's front facing or back facing) the correct color for the vertex is output. This process is depicted graphically in the flow chart of FIG. 4.

Figure 4:
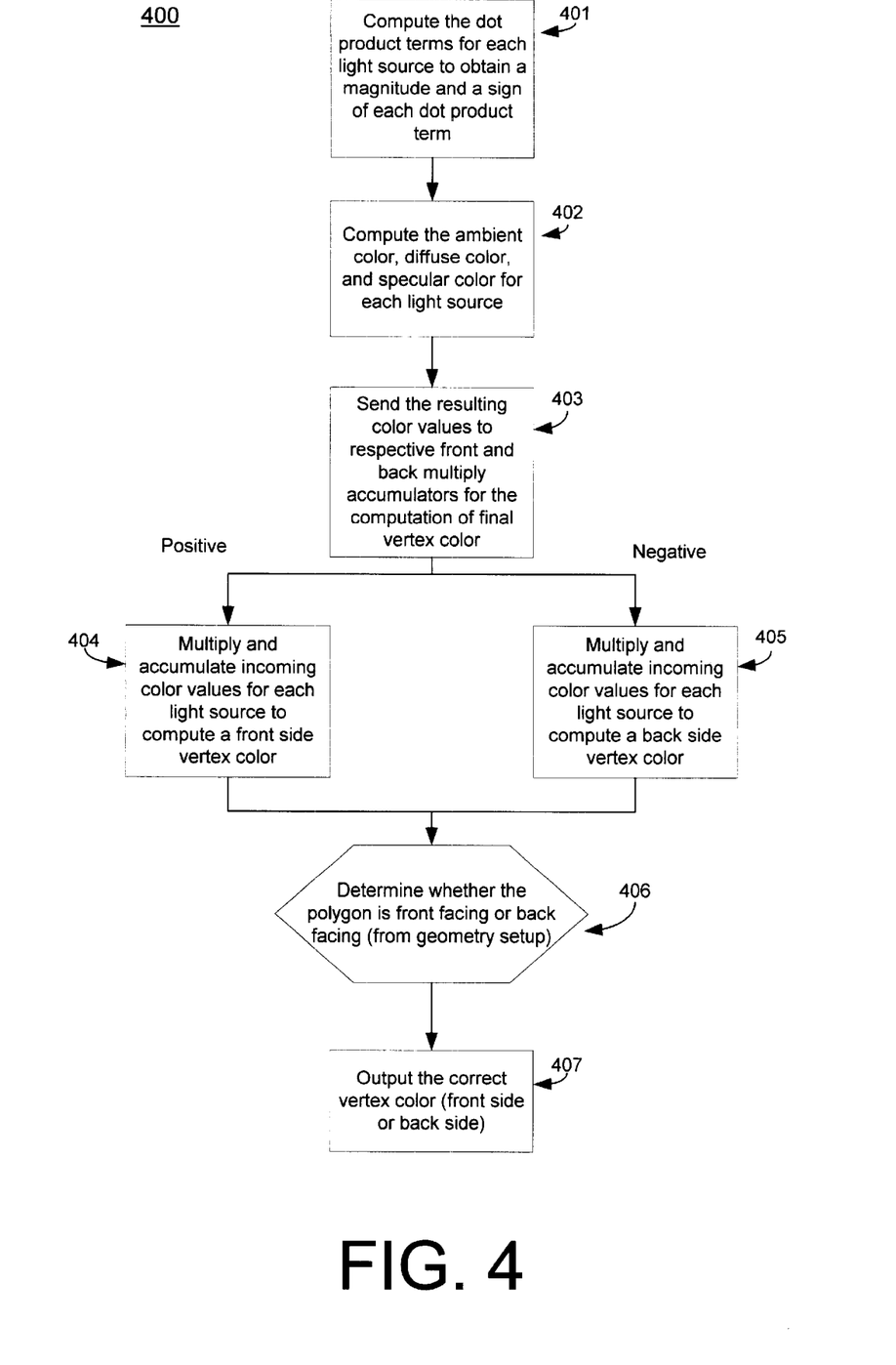
FIG. 4 shows a flow chart of the steps of a front-side and back-side vertex lighting process in accordance with one embodiment of the present invention.

Referring now to FIG. 4, a flow chart of the steps of a front-side and back-side lighting process 400 in accordance with one embodiment of the present invention is shown. Process 400 depicts the steps of a two sided vertex lighting process as performed by lighting hardware in accordance with the present invention.

Process 400 begins in step 401, where a vertex is received and for that vertex, the dot product terms (e.g., terms 310–311 of FIG. 3) for each light source is computed to obtain a magnitude and a sign of each dot product term.

In step 402, the ambient color, diffuse color, and specular color for each light source is computed (e.g., $x^y$).

In step 403, the resulting color values are sent to respective front and back multiply/accumulate units for the computation of the final vertex colors using front-side lights and back-side lights, respectively.

In step 404, where the dot product terms are positive, the incoming color values are multiplied and accumulated for each light source in order to compute a front-side vertex color (e.g., wherein the back-side light source contributions are zero).

In step 405, where the dot product terms are negative, the incoming color values are multiplied and accumulated for each light source to compute a back-side vertex color (e.g., wherein the front-side light source contributions are zero).

In step 406, process 400 determines whether the newly defined triangle is in fact front facing or back facing. In the present embodiment, this information comes from the geometry set-up portion of the graphics pipeline.

In step 407, in accordance with whether the polygon is front facing or back facing as determined in step 406, the correct vertex color is output to the next stage in the graphics pipeline.

Figure 5:
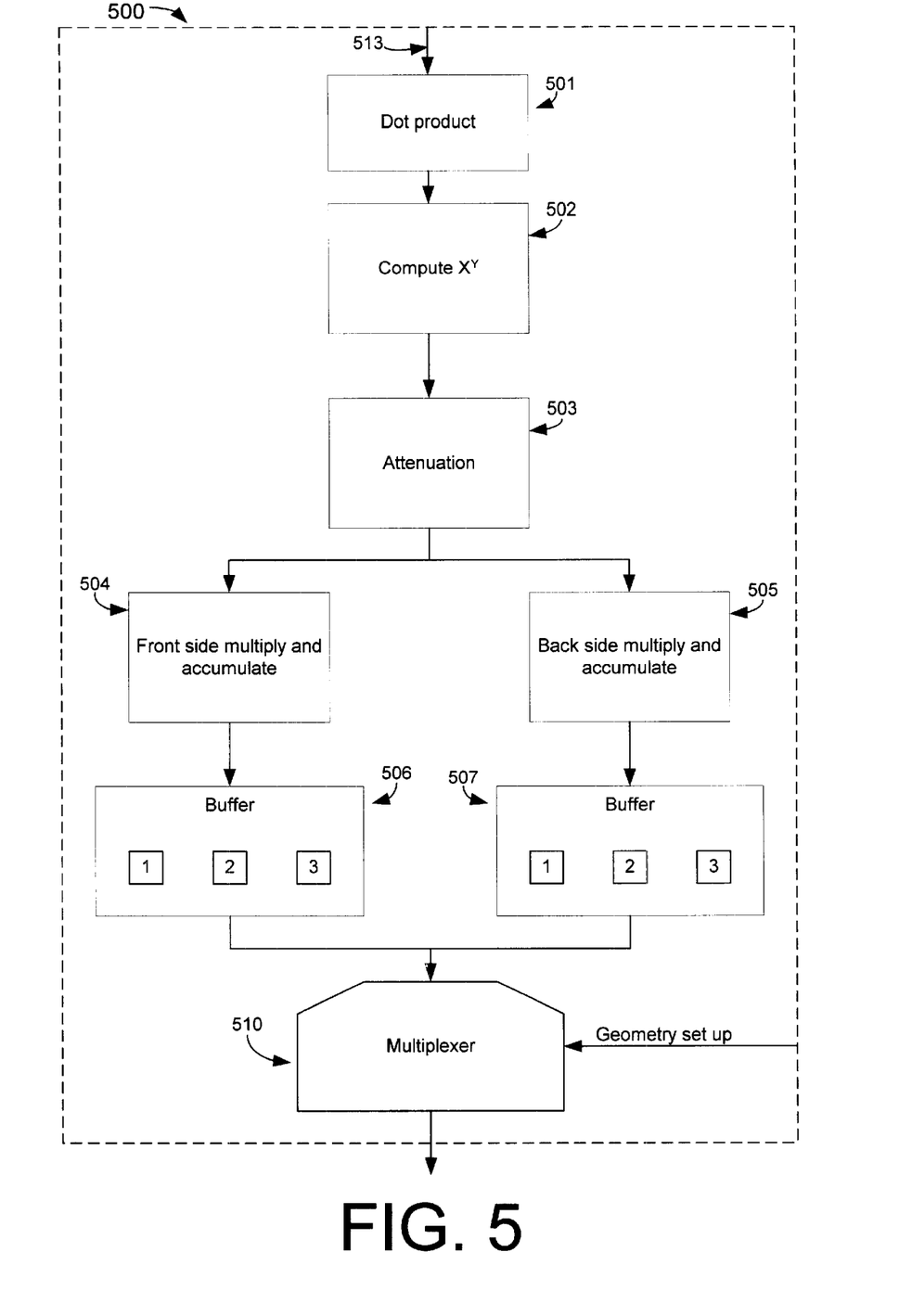
FIG. 5 shows a block diagram of the logic of a lighting system in accordance with one embodiment of the present invention.

With reference to FIG. 5, a block diagram of the logic of the lighting system 500 in accordance with one embodiment of the present invention is shown. As depicted FIG. 5, lighting system 500 implements the steps of process 400 of FIG. 4.

Lighting system 500 includes a dot product unit 501 which is coupled to receive vertices from preceding stages in the pipeline via line 515. As described above, for each received vertex, the dot product terms (e.g., terms 310–311 of FIG. 3) for each light source is computed to obtain a magnitude and a sign of each dot product term. A color computation unit 502 computes the ambient color, diffuse color, and specular color for each light source (e.g., $x^y$). Attenuation unit 503 multiplies the ambient color, diffuse color, and specular color values by an attenuation factor, as shown in equations 302 of FIG. 3.

As described above, the resulting color values are sent to respective front and back multiply/accumulate units 504–505 for the computation of the final vertex colors using front-side lights and back-side lights, respectively. In unit 504, where the dot product terms are positive, the incoming color values are multiplied and accumulated for each light source in order to compute a front-side vertex color (e.g., wherein the back-side light source contributions are zero). In unit 505, where the dot product terms are negative, the incoming color values are multiplied and accumulated in or to compute a back-side vertex color (e.g., wherein the front-side light source contributions are zero). The resulting vertex colors are then stored in respective buffers 506–507. Since each polygon is defined by three vertices, the most recently processed three vertices are stored in three registers included within each of buffers 506–507. Buffers 506–507 are coupled to a multiplexer 510 which is controlled by information received from the geometry set-up portion of the graphics pipeline. Hence, when geometry set-up determines whether the newly defined triangle is in fact front facing or back facing, the correct vertex color is output to the next stage in the graphics pipeline by multiplexer 510.

In the case where the previous two vertices are output with incorrect color (e.g., front-side color), multiplexer 510 "re-sends" the previous two vertices with the correct color (e.g., back-side color). Hence, rendering can proceed with maximum efficiency, without the need to stall the pipeline, discard incorrect color information, recompute correct color information, and restart the pipeline. In addition, as depicted in FIG. 5, only the multiply/accumulate hardware need be duplicated (e.g., units 504–507). Units 501–503 are coupled serially as a single threaded pipeline, while units 504–507 are duplicated and coupled in parallel. This advantageous aspect minimizes the silicon die area impact associated with incorporating lighting system 500 in a graphics pipeline.

Thus, the present invention provides a method and system for efficiently implementing two sided vertex lighting in the hardware of the graphics rendering pipeline of a computer system. The present invention provides a method for rendering back-side color as needed without incurring a pipeline stall and the associated loss of efficiency. The system the present invention is able to seamlessly handle both the front-side lighting and the back-side lighting as dictated by the geometry of the scene being rendered. In addition, the system the present invention can be implemented without incurring an excessive hardware penalty (e.g., silicon die surface area).

What is claimed is:

1. In a graphics subsystem of a computer system, a method for performing front-side and back-side vertex lighting of successive polygons in the graphics pipeline without incurring pipeline stalls, the method comprising the steps of:

a) computing the dot product terms of a plurality of light sources with respect to a polygon surface to obtain a magnitude and a sign of the dot product terms, wherein a positive dot product term corresponds to a front-side color and a negative dot product term corresponds to a back-side color;

b) for each of the plurality of light sources, computing a color value corresponding to the light source for the polygon surface;

c) multiplying and accumulating the color values resulting from step b) in parallel to obtain a respective front-side polygon color and back-side polygon color;

d) determining whether the polygon is front facing or back facing; and e) outputting the front-side polygon color if the polygon is front facing as determined in step d); and f) outputting the back-side polygon color if the polygon is back facing as determined in step d).

2. The method of claim 1 wherein the color values computed using the positive dot product terms in step b) are multiplied and accumulated to obtain the front-side color of the polygon.

3. The method of claim 1 wherein the color values computed using the negative dot product terms in step b) are multiplied and accumulated to obtain the back-side color of the polygon.

4. The method of claim 1 further including the steps of:

g) storing the front-side color determined in step c) in a first buffer;

h) storing the back-side color determined in step c) in a second buffer;

i) outputting the front-side color as in step e) or the back-side color as in step f) by using a multiplexer coupled to the first buffer and the second buffer; and j) controlling the multiplexer using a signal describing whether the polygon is front facing or back facing.

5. The method of claim 1 wherein steps a) and b) are performed using a single threaded pipeline and step c) is performed using a first and a second multiply/accumulate unit.

6. In a 3D vertex lighting system, a method for performing front-side and back-side vertex lighting of successive polygons in a graphics pipeline without incurring pipeline stalls, the method comprising the steps of:

a) computing the dot product terms of a plurality of light sources with respect to a polygon surface to obtain a magnitude and a sign of the dot product terms, wherein a positive dot product term corresponds to a front-side color and a negative dot product term corresponds to a back-side color;

b) for each of the plurality of light sources, computing a color value corresponding to the light source for the polygon surface;

c) multiplying and accumulating the color values resulting from step b) in parallel to obtain a respective front-side polygon color and back-side polygon color;

d) storing the front-side color determined in step c) in a first buffer;

e) storing the back-side color determined in step c) in a second buffer;

f) determining whether the polygon is front facing or back facing; and g) outputting the front-side color as in step e) or the back-side color by using a multiplexer coupled to the first buffer and the second buffer; and h) controlling the multiplexer using a signal describing whether the polygon is front facing or back facing.

7. The method of claim 6 wherein the color values computed using the positive dot product terms in step b) are multiplied and accumulated to obtain the front-side color of the polygon.

8. The method of claim 6 wherein the color values computed using the negative dot product terms in step b) are multiplied and accumulated to obtain the back-side color of the polygon.

9. The method of claim 6 wherein steps a) and b) are performed using a single threaded pipeline and step c) is performed using a first and a second multiply/accumulate unit.

10. A 3D graphics vertex lighting system for computing front-side and back-side vertex lighting of successive polygons in a graphics pipeline without incurring pipeline stalls, comprising:

a dot product unit for computing the dot product terms of a plurality of light sources with respect to a polygon surface to obtain a magnitude and a sign of the dot product terms, wherein a positive dot product term corresponds to a front-side color and a negative dot product term corresponds to a back-side color;

a color computation unit coupled to the dot product unit for computing a color value for each of the plurality of light sources, the color value corresponding to the light source for the polygon surface;

a first multiply/accumulate unit coupled to the color computation unit for multiplying and accumulating positive color values resulting from step b) to obtain a front-side polygon color;

a second multiply/accumulate unit coupled to the color computation unit for multiplying and accumulating negative color values resulting from step b) to obtain a back-side polygon color;

a first buffer coupled to the first multiply/accumulate unit for storing the front-side;

a second buffer coupled to the second multiply/accumulate unit for storing the back-side color; and a multiplexer coupled to the first and second buffers for outputting the front-side color or the back-side color, the multiplexer controlled by a signal describing whether the polygon is front facing or back facing.

11. The method of claim 10 wherein the color values computed using the positive dot product terms are multiplied and accumulated to obtain the front-side color of the polygon.

12. The method of claim 10 wherein the color values computed using the negative dot product terms are multiplied and accumulated to obtain the back-side color of the polygon.

13. The method of claim 10 wherein the dot product unit and the color computation unit are coupled serially and the first and a second multiply/accumulate units are coupled in parallel.

* * * * *